(12) United States Patent
Lee et al.

(10) Patent No.: US 8,654,071 B2
(45) Date of Patent: Feb. 18, 2014

(54) ELECTRONIC PAPER DISPLAY DEVICE AND METHOD OF MANUFACTURING THE SAME

(75) Inventors: Hwan-Soo Lee, Seoul (KR); Yongsoo Oh, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 110 days.

(21) Appl. No.: 13/409,673

(22) Filed: Mar. 1, 2012

(65) Prior Publication Data
US 2012/0223922 A1    Sep. 6, 2012

(30) Foreign Application Priority Data

Mar. 4, 2011    (KR) .......................... 10-2011-0019308

(51) Int. Cl.
*G09G 3/34*    (2006.01)

(52) U.S. Cl.
USPC ........................................... 345/107; 345/87

(58) Field of Classification Search
USPC ............... 345/87, 107, 204; 445/24; 204/600; 359/296
See application file for complete search history.

(56) References Cited

U.S. PATENT DOCUMENTS

2006/0285194 A1    12/2006    Moriyama et al.

FOREIGN PATENT DOCUMENTS

| JP | 2004511012 A | 4/2004 |
| JP | 200658550 | 2/2006 |
| JP | 2007-86729 A | 4/2007 |
| JP | 2008112082 A | 5/2008 |
| KR | 10-2004-0014029 A | 2/2004 |
| WO | 0229485 A1 | 4/2002 |

OTHER PUBLICATIONS

Korean Office Action, and English translation thereof, issued in Korean Patent Application No. KR 10-2011-0019308 dated May 15, 2012.
Japanese Office Action issued in Application No. 2012-045220 dated Jul. 23, 2013.

*Primary Examiner* — Ricardo L Osorio
(74) *Attorney, Agent, or Firm* — McDermott Will & Emery LLP

(57) ABSTRACT

There are provided an electronic paper display device and a method of manufacturing the same. The electronic paper display device includes first and second substrates disposed to be opposite to each other with a predetermined interval therebetween; barrier ribs formed between the first and second substrates and providing a plurality of cell spaces; first display units disposed in the cell spaces; and second display units inserted into at least one region of the first substrate, the second substrate, and the barrier ribs. Whereby, the image precision of the electronic paper display device may be improved and the contrast and brightness thereof may be improved.

19 Claims, 3 Drawing Sheets

ELECTRONIC PAPER DISPLAY DEVICE AND METHOD OF MANUFACTURING THE SAME

CROSS-REFERENCE TO RELATED APPLICATIONS

This application claims the priority of Korean Patent Application No. 10-2011-0019308 filed on Mar. 4, 2011, in the Korean Intellectual Property Office, the disclosure of which is incorporated herein by reference.

BACKGROUND OF THE INVENTION

1. Field of the Invention

The present invention relates to an electronic paper display device and a method of manufacturing the same, and more particularly, to an electronic paper display device having excellent image precision and excellent contrast and brightness and a method of manufacturing the same.

2. Description of the Related Art

In accordance with information-oriented societies requiring new paradigms, there is demand for a great change in information delivery and sharing schemes. As a flexible display meeting this demand, the development of technology for bendable electronic paper has been accelerated and the technological development of the electronic paper has entered a commercial development stage.

The production costs of electronic paper are lower than those of a conventional flat panel display panel. Further, electronic paper does not require a backlight or a continuous recharging, such as a regular display panel, to thereby be driven with extremely little energy, whereby it is also remarkably superior to the conventional flat panel display panel in view of energy efficiency. In addition, the electronic paper has a very high definition, a wide viewing angle, and a memory function in which characters and images remain displayed, even in the absence of power. Therefore, electronic paper may be applied to extremely varied fields such as electronic books having paper-like pages and moving illustrations, self-updating newspapers, recyclable paper displays for a mobile phones, disposable TV screens, electronic wallpaper, or the like, while having a huge potential market.

The technical approaches to schemes for accomplishing the electronic paper may be divided into four schemes: a twist ball scheme rotating spherical particles using an electrical field, the spherical particles configured of upper and lower hemispheres having opposing charges and different colors; an electrophoresis scheme trapping colored electrification particles mixed with oil in a micro-capsule or a micro-cup or allowing the electrification particles themselves to respond to the application of the electric field; a quick response-liquid power display (QR-LPD) scheme using electrified liquid powder; and a cholesteric liquid crystal display scheme using selective reflection characteristics of cholesteric liquid crystal molecules.

In the twist ball scheme, the inside of a cell is filled with transparent media and twist balls (or rotary bodies) having charges opposite to each other and colored with different colors, for example, a black color and a white color, are disposed in the transparent media. When voltage is applied to the twist balls, the twist balls have the polarity of the charges acting thereupon, according to a direction of the applied voltage, to thereby be rotated such that the opposing polarities face a front surface, thereby displaying a black and white shades.

SUMMARY OF THE INVENTION

An aspect of the present invention provides an electronic paper display device having excellent image precision and excellent contrast and brightness and a method of manufacturing the same.

According to an aspect of the present invention, there is provided an electronic paper display device, including: first and second substrates disposed to be opposite to each other with a predetermined interval therebetween; barrier ribs formed between the first and second substrates and providing a plurality of cell spaces; first display units disposed in the cell spaces; and second display units inserted into at least one region of the first substrate, the second substrate, and the barrier ribs.

The first display units may display a main image and the second display units may display an auxiliary image, wherein the second display units display the same color as that of the first display units.

The first display units may be rotary bodies having two display regions colored with different colors and representing different electrification characteristics.

The first display units may be the rotary bodies having first and second display regions representing different electrification characteristics, wherein the first display region is colored with any one of a red color, a green color, and a blue color, and the second display region is colored with a black color or a white color.

The first display units may be micro-capsules having transparent fluids sealed therein, the transparent fluids having two kinds of electrification particles representing different electrification characteristics dispersed therein.

The first display units may be the transparent fluids and the two kinds of electrification particles dispersed in the transparent fluids and representing the different electrification characteristics.

The second display units may be rotary bodies having two display regions colored with different colors and representing different electrification characteristics.

The second display units may be micro-capsules having transparent fluids sealed therein, the transparent fluids having two kinds of electrification particles representing different electrification characteristics dispersed therein.

The second display units may be the transparent fluids and the two kinds of electrification particles dispersed in the transparent fluids and representing different electrification characteristics.

At least one region of the first substrate, the second substrate and the barrier ribs may be formed to have grooves for receiving the second display units.

The second display units may be inserted into the positions of the first substrate or the second substrate, to correspond to the barrier ribs.

The first display units may be the rotary bodies having two display regions colored with different colors and representing different electrification characteristics, and the second display units may be the micro-capsules inserted into the first substrate and having the transparent fluids sealed therein, the transparent fluids having the two kinds of electrification particles representing different electrification characteristics dispersed therein.

The first display units may be the rotary bodies having two display regions colored with different colors and representing different electrification characteristics, and the second display units may be the micro-capsules inserted into the barrier ribs and having the transparent fluids sealed therein, the transparent fluids having the two kinds of electrification particles representing different electrification characteristics dispersed therein.

The first display units may be the rotary bodies having two display regions colored with different colors and representing different electrification characteristics, and the second display units may be the micro-capsules inserted into the second substrate and having the transparent fluids sealed therein, the transparent fluids having the two kinds of electrification particles representing different electrification characteristics dispersed therein.

According to another aspect of the present invention, there is provided a method of manufacturing an electronic paper display device, the method including: preparing a first substrate into which second display units are inserted; forming barrier ribs dividing a space on the first substrate to thereby form a plurality of cell spaces; disposing first display units in each of the cell spaces; and attaching a second substrate so as to cover the cell spaces, while being disposed to be opposite to the first substrate.

The first substrate may be formed to have grooves into which the second display units are inserted.

The barrier ribs may be formed at positions into which the second display units are inserted.

According to another aspect of the present invention, there is provided a method of manufacturing an electronic paper display device, the method including: preparing a first substrate; forming barrier ribs dividing a space on the first substrate to thereby form a plurality of cell spaces, the barrier ribs having second display units inserted thereinto; disposing first display units in each of the cell spaces; and attaching a second substrate so as to cover the cell spaces, while being disposed to be opposite to the first substrate.

According to another aspect of the present invention, there is provided a method of manufacturing an electronic paper display device, the method including: preparing a first substrate; forming barrier ribs dividing a space on the first substrate to thereby form a plurality of cell spaces; disposing first display units in each of the cell spaces; and attaching a second substrate into which second display units are inserted so as to cover the cell spaces, while being disposed to be opposite to the first substrate.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
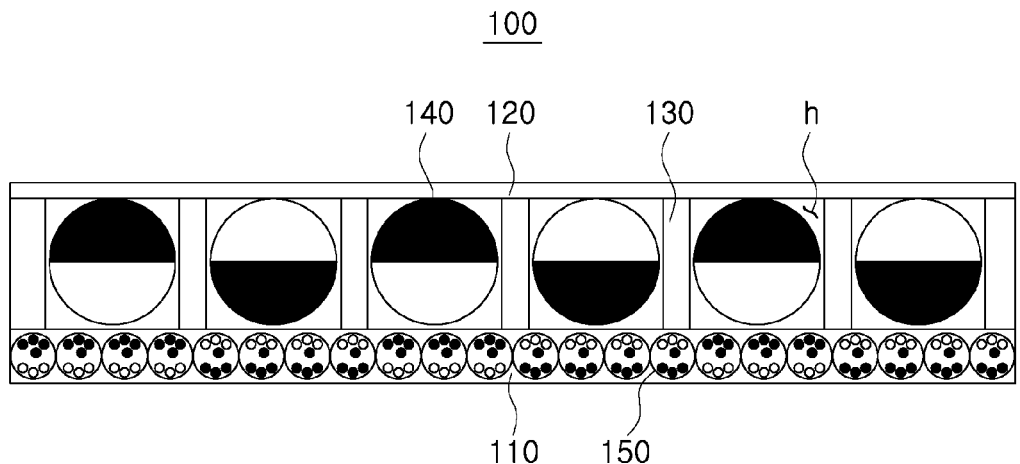
FIG. 1 is a cross-sectional view schematically showing an electronic paper display device according to an exemplary embodiment of the present invention.

Exemplary embodiments of the present invention will now be described in detail with reference to the accompanying drawings. The exemplary embodiments of the present invention may be modified in many different forms and the scope of the invention should not be limited to the embodiments set forth herein. Rather, these embodiments are provided so that this disclosure will be thorough and complete, and will fully convey the concept of the invention to those skilled in the art. In the drawings, the shapes and dimensions may be exaggerated for clarity, and the same reference numerals will be used throughout to designate the same or like components.

FIG. 1 is a cross-sectional view schematically showing an electronic paper display device according to an exemplary embodiment of the present invention. Referring to FIG. 1, an electronic paper display device 100 according to the exemplary embodiment of the present embodiment may include a first substrate 110 and a second substrate 120, disposed to be opposite to each other with a predetermined interval therebetween.

A plurality of barrier ribs 130 may be provided between the first and second substrates 110 and 120, wherein the barrier ribs 130 divide a space between the first and second substrates 110 and 120 to form a plurality of cell spaces h. Rotary bodies 140 having electrical and optical anisotropy are disposed in the cell spaces h, as first display units.

The first substrate 110 and the second substrate 120 may be formed of flexible plastic. As the plastic, for example, polyethylene terephthalate (PET), polycarbonate (PC), polymethyl methacrylate (PMMA), polyethylenenapthalate (PEN), polyethersulfone (PES), cyclic olefin copolymer (COC), polydimethylsiloxane (PDMS), poly urethane acrylate (PUA), or the like, may be used without being limited thereto.

A first electrode (not shown) and a second electrode (not shown) may be formed on the first substrate 110 and the second substrate 120 in order to apply voltage to the rotary bodies 14.

The first electrode and the second electrode may be formed of an electrode material that is generally used in the technical field of the present invention, as a conductive material. For example, the first electrode and the second electrode may be formed of a conductive polymer such as poly thiophene or polyaniline, metal particles such as silver or nickel, a polymer film including the metal particles, indium-tin-oxide (ITO) or the like.

In addition, a control unit may be provided in the first substrate 110 and the second substrate 120 in order to control magnitude and direction of the voltage applied to the rotary bodies.

The second substrate 120 and the second electrode may be provided as a display surface and to this end, the second substrate 120 and the second electrode may be formed of light transmitting material.

A plurality of barrier ribs 130 may be provided in the space between the first substrate 110 and the second substrate 120. The barrier ribs 130 divide a space between the first and second substrates 110 and 120 to thereby form a plurality of cell spaces h. In the present invention, the space between the barrier ribs is defined as the cell space.

The barrier rib 130 may be formed of a flexible material and may be formed of a thermosetting resin or a UV curable resin, without being specifically limited thereto.

The barrier rib 130 may be formed of, for example, polyethylene terephthalate (PET), polycarbonate (PC), polymethyl methacrylate (PMMA), polyethylenenapthalate (PEN), polyethersulfone (PES), cyclic olefin copolymer (COC), polydimethylsiloxane (PDMS), poly urethane acrylate (PUA), or the like.

The barrier rib 130 may be formed of a transparent material, as needed.

Rotary bodies 140 having electrical and optical anisotropy are disposed in each of the cell spaces h, as first display units. In addition, the cell spaces h may be filled with dielectric liquid so that the rotary bodies can be easily rotated.

Figure 2:
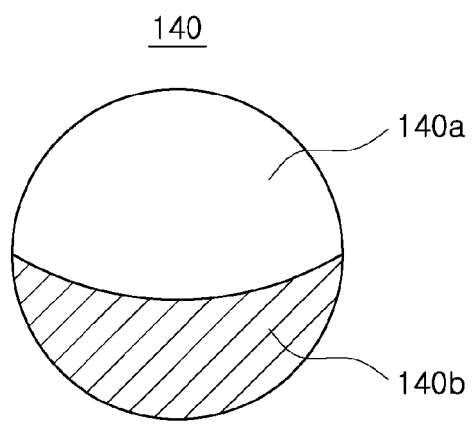
FIG. 2 is an enlarged perspective view of a rotary body according to an exemplary embodiment of the present invention.

FIG. 2 is an enlarged perspective view of the rotary body 140. Referring to FIG. 2, the rotary bodies 140 may have two display regions 140a and 140b, which are colored with different colors and represent different electrification characteristics. The two display regions may be colored with different colors, wherein the first display region 140a may be colored with a white color and the second display region 140b may be colored with a black color. When the first display region 140a is electrified with positive charges, the second display region 140b is electrified with negative charges. When voltage is applied to the rotary bodies 140, they are rotated according to the magnitude and direction of the applied voltage, thereby displaying a black color or a white color according to the color colored in the two display regions.

In a method of forming the first and second display regions 140a and 140b by performing an electrical and optical treatment on the rotary bodies 140, a method known in this field may be used. For example, a method of inserting a rotary body into a rotary disc having two colored liquids and then having centrifugal force act on the rotary body may be used.

The shape of the rotary body 140 is not specifically limited and the rotary body 140 may have, for example, a circular shape, an oval shape or a cylindrical shape.

In addition, the first and second display regions may be colored with various colors rather than the black color or the white color.

For example, the first display region may be colored with any one of red, green, and blue colors, and the second display region may be colored with the black color or the white color.

In the exemplary embodiment of the present embodiment, micro-capsules 150 may be inserted into the first substrate 110 as second display units, the micro-capsules 150 having transparent fluids sealed therein, the transparent fluids having two kinds of particles having different electrification characteristics dispersed therein.

Figure 3:
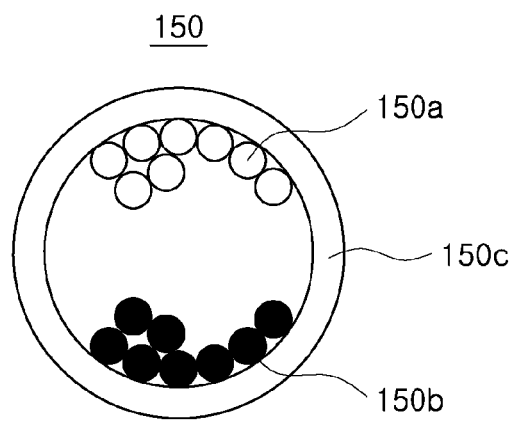
FIG. 3 is an enlarged cross-sectional view of a microcapsule according to an exemplary embodiment of the present invention.

FIG. 3 is an enlarged cross-sectional view of the micro-capsule 150. Referring to FIG. 3, in the micro-capsule 150, the transparent fluid may be sealed with an outer wall 150c of the capsule, the transparent fluid having two kinds of particles 150a and 150b that have different electrification characteristics, move due to an electrophoretic phenomenon and are dispersed therein. The electrification particles dispersed in the transparent fluid may be white particles 150a having positive charges and black particles 150b having negative charges.

When voltage is applied to the micro-capsule 150, the electrified particles 150a and 150b ascend or descend, thereby representing a black color or a white color.

Voltage may be applied to the rotary body 140 by the first and second electrodes provided on the first and second substrates 110 and 120. The rotary body 140 is rotated such that an electrified state formed thereon comes into equilibrium according to the direction of the applied voltage and the black color or the white color is displayed by the color colored in the two display regions. In other words, a main image is displayed by the rotary bodies disposed in the cell spaces.

When display units are partitioned by barrier ribs or the like and disposed therebetween, there may be regions on which the main image is not displayed such as the barrier ribs, a space between the display units, and the like, such that the image precision may be degraded thereby.

In addition, when the barrier ribs and the space between the display units display a fixed color such as a black color, a white color or the like, contrast or brightness of the electronic paper display device may be degraded.

More specifically, when the barrier ribs and the space between the display units display the black color, the contrast of the main image may be excellent but the brightness thereof may be degraded. In contrast, when the barrier ribs and the space between the display units display the white color, the brightness of the main image may be excellent but the contrast thereof may be degraded.

According to the exemplary embodiment of the present embodiment, the micro-capsules 150 may be inserted into the first substrate 110 as second display units. In the present embodiment, the second display units may imply a display unit that is inserted into a region on which the main image is not displayed by the first display unit and that displays an auxiliary image.

The first display unit may have a larger size than that of the second display unit. In the present embodiment, the rotary body may have a particle size of 40 to 80 μm and the micro-capsule may have a particle size of 20 to 50 μm.

When a display region of the rotary body 140, displaying the white color, is electrified with positive charges and a display region thereof, displaying the black color, is electrified with negative charges, white micro-capsule particles may have positive charges and black micro-capsule particles may have negative charges.

Therefore, the micro-capsules 150 in the peripheral region of the rotary body 140 displaying the black color in the micro-capsules 150 inserted into the first substrate may also display the black color, and the micro-capsules 150 in the peripheral region of the rotary body 140 displaying the white color may also display the white color. In other words, the color of the peripheral regions on which the main image is not displayed may be converted into the black or white by the voltage applied thereto.

According to the present embodiment, the image may be also displayed on the barrier ribs and in the space between the rotary bodies, such that the image precision can be improved and the contrast and brightness thereof can also be improved.

When the first display region of the rotary body is colored with the red, green or blue color and is electrified with positive charges and the second display region is colored with the black color or the white color and is electrified with negative charges, the electrification particles having the positive charges of the micro-capsule may be colored with the red, green or blue color and the electrification particles having the negative charges may be colored with the black color or the white color.

Therefore, the image precision of the electronic paper display device displaying colors may become excellent and the excellent contrast and brightness thereof may be displayed.

In addition, the color combination of the rotary body and the micro-capsule displaying colors may be cyan, magenta, and yellow.

Although not shown, according to an embodiment of the present invention, the first display units may be micro-capsules having the transparent fluids sealed therein, the transparent fluids having two kinds of particles having different electrification characteristics dispersed therein. As described above, when voltage is applied to the micro-capsule, the electrified particles therein ascend or descend, such that a black color or a white color is represented, thereby displaying the main image.

According to an exemplary embodiment of the present invention, the transparent fluids and two kinds of electrification particles having different electrification characteristics dispersed in the transparent fluids may be disposed in the cell spaces, as the first display units.

The micro-capsules, the rotary bodies or two kinds of electrification particles having different electrification characteristics and being colored with different colors may be disposed in the first substrate, as the second display units. The second display units disposed in the first substrate may display the white color or the black color in the same manner of the main image displayed by the first display units.

In the embodiment of the present invention, the second display unit is not particularly limited and may be any one capable of accomplishing an auxiliary image on a region in which the main image is not displayed, such as the barrier ribs, a region between the rotary bodies, or the like. For example, an auxiliary image may be accomplished by electrowetting.

Figure 4:
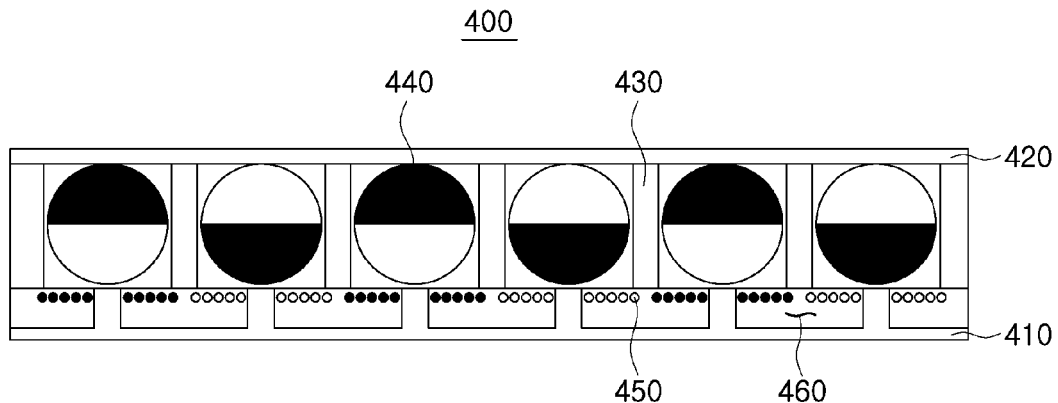
FIG. 4 is a cross-sectional view schematically showing an electronic paper display device according to another exemplary embodiment of the present invention.

FIG. 4 is a cross-sectional view schematically showing an electronic paper display device according to another exemplary embodiment of the present invention. This will be described based on constituents different from those in the aforementioned embodiment and the detailed description of the same constituents will be omitted.

Referring to FIG. 4, an electronic paper display device 400 according to the present embodiment may include a first substrate 410 and a second substrate 420, disposed to be opposite to each other with a predetermined interval therebetween.

A plurality of barrier ribs 430 may be provided between the first and second substrates 410 and 420, wherein the barrier ribs 430 divide a space between the first and second substrates 410 and 420 to form a plurality of cell spaces. Rotary bodies 440 having electrical and optical anisotropy may be disposed in the cell spaces, as first display units.

Transparent fluids and two kinds of electrification particles 450 dispersed in the transparent fluids and having different electrification characteristics are inserted into the first substrate 410, as second display units.

Grooves 460 for receiving the transparent fluids and the electrification particles may be formed in the first substrate 410. In the two kinds of the electrification particles inserted into the grooves, white particles may be electrified with positive charges and black particles may be electrified with negative charges in the same manner as the electrification characteristics of the rotary body 440. Therefore, the second display units disposed in the first substrate may display a white color or a black color in the same manner of a main image displayed by the first display units.

As shown in FIG. 4, the groove 460 may be formed of a plurality of grooves to be partitioned. Although not shown, the groove may also be formed of a single groove over the entire region of the first substrate.

The grooves 460 may be formed at positions of the first substrate 410 so as to correspond to the barrier ribs 430. In addition, one groove 460 may be formed over two cell spaces, while corresponding to one barrier rib. In other words, two grooves 460 may be matched with one cell space. In the two kinds of electrification particles disposed on one groove 460, white particles may ascend in some and black particles may ascend in others, similar to the rotary body disposed in the cell space.

An auxiliary image may be displayed on the barrier ribs 410 and in the space between the rotary bodies by the second display units 450. Therefore, the image precision of the electronic paper display device may be excellent and the excellent contrast and brightness thereof may be displayed.

Figure 5:
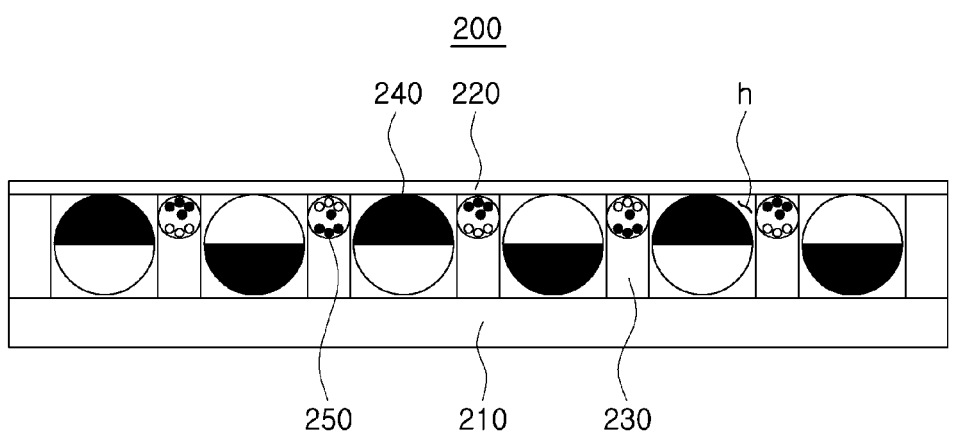
FIG. 5 is a cross-sectional view schematically showing an electronic paper display device according to another exemplary embodiment of the present invention.

FIG. 5 is a cross-sectional view schematically showing an electronic paper display device according to another exemplary embodiment of the present invention. This will be described based on constituents different from those in the aforementioned embodiment and the detailed description of the same constituents will be omitted.

Referring to FIG. 5, an electronic paper display device 200 according to the present embodiment may include a first substrate 210 and a second substrate 220, disposed to be opposite to each other with a predetermined interval therebetween.

A plurality of barrier ribs 230 may be provided between the first and second substrates 210 and 220, wherein the barrier ribs 230 divide a space between the first and second substrates 210 and 220 to form a plurality of cell spaces h. Rotary bodies 240 having electrical and optical anisotropy may be disposed in the cell spaces h, as first display units.

In the present embodiment, micro-capsules 250 may be inserted into the barrier ribs 230 as second display units, the micro-capsules 250 having transparent fluids sealed therein, the transparent fluids having two kinds of particles having different electrification characteristics dispersed therein.

When a display region of the rotary body 240, displaying a white color, is electrified with positive charges and a display region thereof displaying a black color is electrified with negative charges, white micro-capsule particles may have positive charges and black micro-capsule particles may have negative charges.

Therefore, the micro-capsules 250 adjacent to the rotary body 240 displaying the black color in the micro-capsules 250 inserted into the barrier ribs may also display the black color and the micro-capsules 250 adjacent to the rotary body 240 displaying the white color may also display the white color.

The display units may be disposed in the barrier ribs according to the present embodiment and an image is displayed thereby, such that the image precision may be improved. In addition, the contrast and brightness of the electronic paper display device may be improved.

Although not shown, as the first display units, the micro-capsules having the transparent fluids sealed therein, the transparent fluids having two kinds of particles having different electrification characteristics dispersed therein, may be disposed, or the transparent fluids and the two kinds of electrification particles dispersed in the transparent fluids, colored with different colors, and having different electrification characteristics may be disposed in the cell spaces as described above.

As the second display units, the micro-capsules, the rotary bodies, or the transparent fluids and the two kinds of electrification particles dispersed in the transparent fluids and having different electrification characteristics may be disposed in the barrier ribs. Grooves for receiving the second display units may be formed in the barrier ribs.

Figure 6:
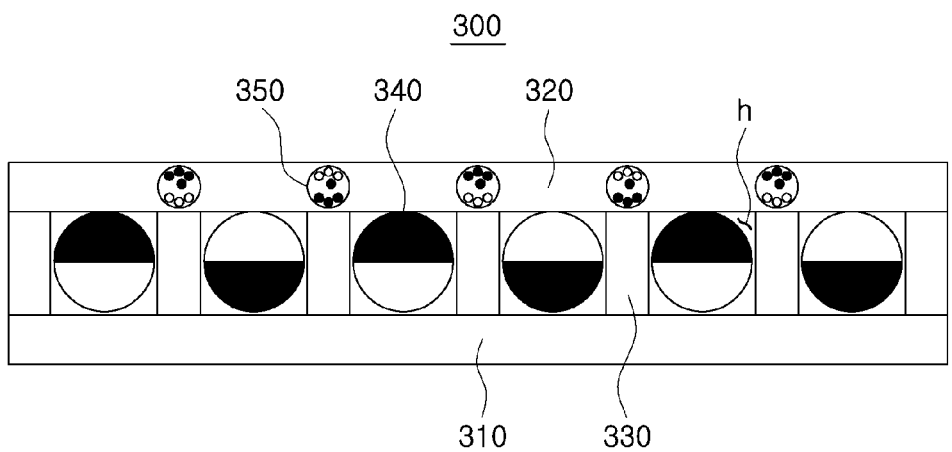
FIG. 6 is a cross-sectional view schematically showing an electronic paper display device according to another exemplary embodiment of the present invention.

FIG. 6 is a cross-sectional view schematically showing an electronic paper display device according to another exemplary embodiment of the present invention. This will be described based on constituents different from those in the aforementioned embodiment and the detailed description of the same constituents will be omitted.

Referring to FIG. 6, an electronic paper display device 300 according to the present embodiment may include a first substrate 310 and a second substrate 320, disposed to be opposite to each other with a predetermined interval therebetween.

A plurality of barrier ribs 330 may be provided between the first and second substrates 310 and 320, wherein the barrier ribs 330 divide a space between the first and second substrates 310 and 320 to form a plurality of cell spaces h. Rotary bodies 340 having electrical and optical anisotropy may be disposed in the cell spaces h, as first display units.

In the present embodiment, micro-capsules 350 may be inserted into the second substrate 320 as second display units, the micro-capsules 350 having transparent fluids sealed therein, the transparent fluids having two kinds of particles having different electrification characteristics dispersed therein. The micro-capsules 350 may be inserted into predetermined positions of the second substrate 320 in order to fill a space between the rotary bodies. The micro-capsules 350 may be inserted into the positions corresponding to the barrier ribs 330, in the second substrate.

When a display region of the rotary body 340, displaying a white color, is electrified with positive charges and a display region thereof, displaying a black color, is electrified with negative charges, white micro-capsule (350) particles may have positive charges and black particles thereof may have negative charges.

Therefore, the micro-capsules 350 adjacent to the rotary body 340 displaying the black color in the micro-capsules 350 inserted into the second substrate may also display the black color and the micro-capsules 350 adjacent to the rotary body 340 displaying the white color may also display the white color.

According to the present embodiment, the display units may be disposed in the second substrate in order to fill a space between the rotary bodies and an image may be displayed thereby, such that the image precision may be improved. In addition, the contrast and brightness of the electronic paper display device may be improved.

Although not shown, as the first display units, the micro-capsules having the transparent fluids sealed therein, the transparent fluids having two kinds of particles having different electrification characteristics dispersed therein, may be disposed, or the transparent fluids and the two kinds of electrification particles dispersed in the transparent fluids, colored with different colors, and having different electrification characteristics may be disposed in the cell spaces as described above.

As the second display units, the micro-capsules, the rotary bodies, or the transparent fluids and the two kinds of electrification particles dispersed in the transparent fluids and having different electrification characteristics may be disposed in the second substrate. Grooves for receiving the second display units may be formed in the second substrate.

Hereinafter, a method of manufacturing an electronic paper display device according to an exemplary embodiment of the present invention will be described.

Figure 7A:
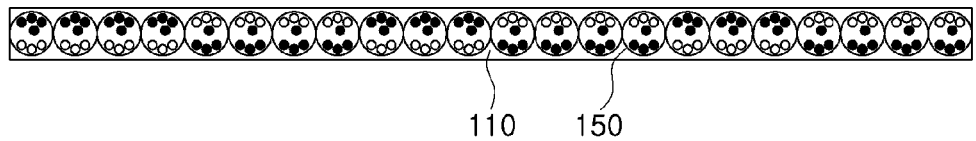
FIGS. 7A through 7C are cross-sectional views for each process explaining a method of manufacturing an electronic paper display device according to an exemplary embodiment of the present invention.
Figure 7B:
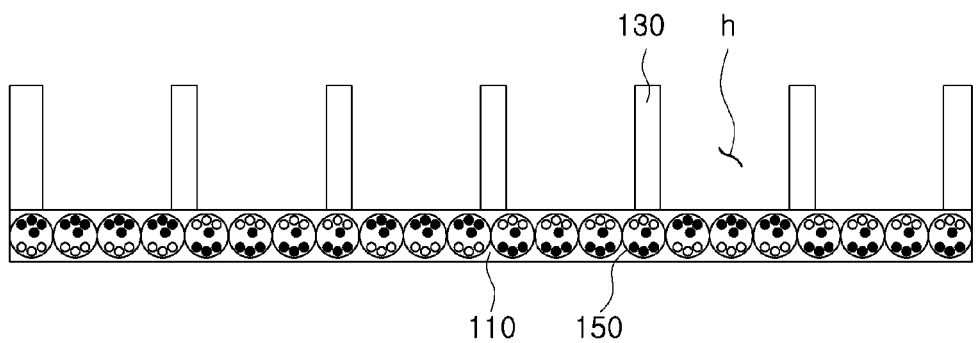
Figure 7C:
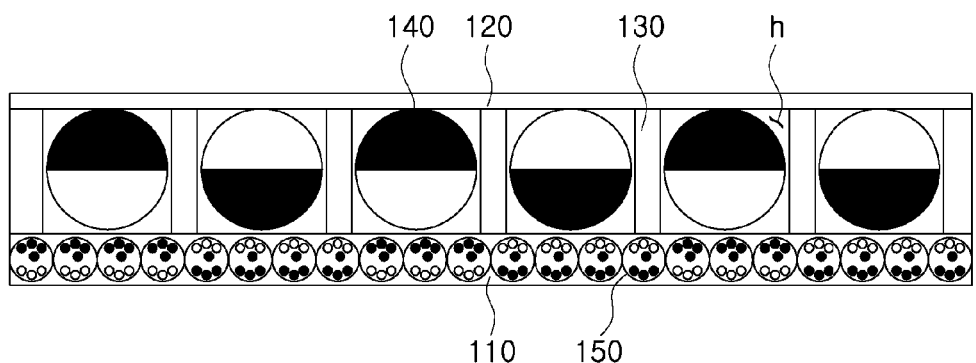

FIGS. 7A through 7C are cross-sectional views for each process explaining a method of manufacturing an electronic paper display device according to an exemplary embodiment of the present invention.

First, a first substrate may be prepared as shown in FIG. 7A. The first substrate may be formed of flexible plastic and micro-capsules 150 may be inserted into the first substrate at the time of the forming of the first substrate, the micro-capsules 150 being used as second display units.

Although not shown, in addition to the micro-capsules, rotary bodies may be inserted into the first substrate. Alternatively, grooves may be formed in the inside of the first substrate and then transparent fluids and two kinds of electrification particles dispersed in the transparent fluids and having different electrification characteristics may be inserted thereinto. In this case, the groove may be formed of a single groove over the entire region of the first substrate. Alternatively, the groove may be formed of a plurality of grooves to be partitioned. In this case, the grooves to be partitioned may be formed so as to correspond to positions of barrier ribs to be subsequently formed.

Next, as shown in FIG. 7B, barrier ribs 130 dividing a space on the first substrate 110 to thereby form a plurality of cell spaces h may be formed. The barrier ribs 130 may be formed of a thermosetting resin or a UV curable resin and be formed by forming a resin layer having a predetermined thickness and then performing a patterning process thereon.

For example, an imprinting process may be performed. First, a resin layer having a predetermined thickness may be formed and is then compressed with a stamp having relief and intaglio patterns, whereby the plurality of barrier ribs may be formed. The barrier ribs and the cell spaces partitioned by the barrier ribs may be formed according to the relief and intaglio patterns of the stamp. In this case, the interval of the barrier ribs and the shape and size of the cell space may be controlled by controlling the relief and intaglio patterns of the stamp.

Next, as shown in FIG. 7C, rotary bodies 140 used as first display units may be disposed in the plurality of cell spaces h. The rotary body 140 may be injected into the cell space using a mask, a squeezer, or the like.

Next, a second substrate 120 may be attached in order to cover the cell spaces h, while being disposed to be opposite to the first substrate 110. Thereby, the electronic paper display device as shown in FIG. 1 may be manufactured.

Although not shown, the first substrate may be formed of flexible plastic and the barrier ribs may be formed, the barrier ribs dividing the space on the first substrate to thereby form the plurality of cell spaces. In this case, the second display units may be inserted into the barrier ribs.

Thereafter, the first display units may be disposed in the cell spaces and the second substrate may be attached so as to cover the cell spaces, while being disposed to be opposite to the first substrate. Thereby, the electronic paper display device as shown in FIG. 4 may be manufactured.

Although not shown, the first substrate may be formed of flexible plastic and the barrier ribs may be formed, the barrier ribs dividing the space on the first substrate to thereby form the plurality of cell spaces.

Thereafter, the first display units may be disposed in the cell spaces. Next, the second substrate into which the second display units have been inserted may be prepared and the second substrate may be attached so as to cover the cell spaces, while being disposed to be opposite to the first substrate. Thereby, the electronic paper display device as shown in FIG. 5 may be manufactured.

As set forth above, according to exemplary embodiments of the present invention, an electronic paper display device may include first display units and second display units.

The first display units may display a main image and the second display units may be disposed in the peripheral region on which the main image is not displayed.

Therefore, the image may also be displayed on the barrier ribs and the space between rotary bodies, on which the main image is not displayed, such that the image precision can be improved and the contrast and brightness thereof can also be improved.

While the present invention has been shown and described in connection with the exemplary embodiments, it will be apparent to those skilled in the art that modifications and variations can be made without departing from the spirit and scope of the invention as defined by the appended claims.

What is claimed is:

1. An electronic paper display device, comprising:
    first and second substrates disposed to be opposite to each other with a predetermined interval therebetween;
    barrier ribs formed between the first and second substrates and providing a plurality of cell spaces;
    first display units disposed in the cell spaces; and
    second display units inserted into at least one region of the first substrate, the second substrate, and the barrier ribs.

2. The electronic paper display device of claim 1, wherein the first display units display a main image and the second display units display an auxiliary image, the second display units displaying the same color as that of the first display units.

3. The electronic paper display device of claim 1, wherein the first display units are rotary bodies having two display regions colored with different colors and representing different electrification characteristics.

4. The electronic paper display device of claim 1, wherein the first display units are the rotary bodies having first and second display regions representing different electrification characteristics, the first display region being colored with any one of a red color, a green color, and a blue color, and the second display region being colored with a black color or a white color.

5. The electronic paper display device of claim 1, wherein the first display units are micro-capsules having transparent fluids sealed therein, the transparent fluids having two kinds of electrification particles representing different electrification characteristics dispersed therein.

6. The electronic paper display device of claim 1, wherein the first display units are the transparent fluids and the two kinds of electrification particles dispersed in the transparent fluids and representing the different electrification characteristics.

7. The electronic paper display device of claim 1, wherein the second display units are rotary bodies having two display regions colored with different colors and representing different electrification characteristics.

8. The electronic paper display device of claim 1, wherein the second display units are micro-capsules having transparent fluids sealed therein, the transparent fluids having two kinds of electrification particles representing different electrification characteristics dispersed therein.

9. The electronic paper display device of claim 1, wherein the second display units are the transparent fluids and the two kinds of electrification particles dispersed in the transparent fluids and representing different electrification characteristics.

10. The electronic paper display device of claim 1, wherein at least one region of the first substrate, the second substrate and the barrier ribs is formed to have grooves for receiving the second display units.

11. The electronic paper display device of claim 1, wherein the second display units are inserted into the positions of the first substrate or the second substrate, to correspond to the barrier ribs.

12. The electronic paper display device of claim 1, wherein the first display units are the rotary bodies having two display regions colored with different colors and representing different electrification characteristics, and the second display units are the micro-capsules inserted into the first substrate and having the transparent fluids sealed therein, the transparent fluids having the two kinds of electrification particles representing different electrification characteristics dispersed therein.

13. The electronic paper display device of claim 1, wherein the first display units are the rotary bodies having two display regions colored with different colors and representing different electrification characteristics, and the second display units are the micro-capsules inserted into the barrier ribs and having the transparent fluids sealed therein, the transparent fluids having the two kinds of electrification particles representing different electrification characteristics dispersed therein.

14. The electronic paper display device of claim 1, wherein the first display units are the rotary bodies having two display regions colored with different colors and representing different electrification characteristics, and the second display units are the micro-capsules inserted into the second substrate and having the transparent fluids sealed therein, the transparent fluids having the two kinds of electrification particles representing different electrification characteristics dispersed therein.

15. A method of manufacturing an electronic paper display device, the method comprising:
    preparing a first substrate into which second display units are inserted;
    forming barrier ribs dividing a space on the first substrate to thereby form a plurality of cell spaces;
    disposing first display units in each of the cell spaces; and
    attaching a second substrate so as to cover the cell spaces, the second substrate being disposed to be opposite to the first substrate.

16. The method of claim 15, wherein the first substrate is formed to have grooves into which the second display units are inserted.

17. The method of claim 15, wherein the barrier ribs are formed at positions into which the second display units are inserted.

18. A method of manufacturing an electronic paper display device, the method comprising:
    preparing a first substrate;
    forming barrier ribs dividing a space on the first substrate to thereby form a plurality of cell spaces, the barrier ribs having second display units inserted thereinto;
    disposing first display units in each of the cell spaces; and
    attaching a second substrate so as to cover the cell spaces, the second substrate being disposed to be opposite to the first substrate.

19. A method of manufacturing an electronic paper display device, the method comprising:
    preparing a first substrate;
    forming barrier ribs dividing a space on the first substrate to thereby form a plurality of cell spaces;
    disposing first display units in each of the cell spaces; and
    attaching a second substrate into which second display units are inserted so as to cover the cell spaces, the second substrate being disposed to be opposite to the first substrate.

* * * * *